United States Patent [19]

Hayashi et al.

[11] 4,454,087

[45] Jun. 12, 1984

[54] METHOD AND APPARATUS FOR PREPARING THERMOPLASTIC RESIN FOAM

[75] Inventors: Motoshige Hayashi; Shigetoshi Tanaka; Motokazu Yoshii, all of Nara; Tsuneo Doi, Ibaragi, all of Japan

[73] Assignee: Sekisui Plastics, Nara, Japan

[21] Appl. No.: 379,085

[22] Filed: May 17, 1982

[30] Foreign Application Priority Data

May 18, 1981 [JP] Japan ................... 56-75442

[51] Int. Cl.³ .................. B29D 27/00; B29F 3/02
[52] U.S. Cl. ................... 264/53; 264/50;
  264/DIG. 5; 264/DIG. 13; 425/4 C; 425/207;
  425/209; 425/817 C
[58] Field of Search .......... 264/53, 51, 50, 54,
  264/DIG. 5, DIG. 13; 425/4 C, 817 C, 207, 209

[56] References Cited

U.S. PATENT DOCUMENTS

| | | | |
|---|---|---|---|
| 2,669,751 | 2/1954 | McCurdy et al. | 264/53 |
| 3,316,335 | 4/1967 | Snella et al. | 264/50 |
| 3,588,955 | 6/1971 | Azuma | 264/53 X |
| 3,751,377 | 8/1973 | Buckner | 264/53 X |
| 3,817,669 | 6/1974 | Buckner | 264/53 X |
| 3,827,841 | 8/1974 | Kawai et al. | 425/4 C |
| 4,201,480 | 5/1980 | Brand | 264/53 X |
| 4,222,729 | 9/1980 | Ragazzini et al. | 264/53 X |
| 4,302,409 | 11/1981 | Miller et al. | 264/53 X |
| 4,362,482 | 12/1982 | Rutledge | 425/4 C |

FOREIGN PATENT DOCUMENTS

| | | |
|---|---|---|
| 43-15712 | 7/1968 | Japan . |
| 48-544 | 1/1973 | Japan . |
| 52-133364 | 11/1977 | Japan . |
| 53-148755 | 12/1978 | Japan . |
| 54-42026 | 12/1979 | Japan . |

Primary Examiner—Philip E. Anderson
Attorney, Agent, or Firm—Armstrong, Nikaido, Marmelstein & Kubovcik

[57] ABSTRACT

A method and apparatus for preparing a substantially uniform thermoplastic foam extruded from an extruder, the molten thermoplastic resin having uniformly distributed therein a foaming agent. A cooling-mixer continuously receives the extruded mass of resin and foaming agent from the extruder and intimately mixes and substantially cools the mass. A substantially adiabatic zigzag mixer is connected to the cooling-mixer and divides the mass into a plurality of separate streams which are at least partially separated and recombined. A die is connected to the zigzag mixer and extrudes the uniformly cooled mass into a lower pressure zone to produce a substantially uniform thermoplastic foam.

14 Claims, 9 Drawing Figures

METHOD AND APPARATUS FOR PREPARING THERMOPLASTIC RESIN FOAM

BACKGROUND OF THE INVENTION

This invention relates to a method and apparatus for preparing thermoplastic foams.

Various methods have been employed for preparing the thermoplastic foams. In many of these methods, an extruder has been used. The reasons for this are that, when an extruder is used, the thermoplastic foams can be prepared continuously, and hence advantageously. In a method using an extruder, a thermoplastic resin is heated and melted in the extruder, a foaming agent is injected into the molten resin to form a mixture, in which the foaming agent is uniformly mixed with the resin under pressure, the mixture is then forced through a die to have a desired shape in cross section, and thereafter extruded from the die. Thus, extruded resin is foamed in the air to be a foam.

In the method mentioned above, in order to prepare a uniform composition by injecting the foaming agent into the resin in the extruder, it is required that the resin be at a very high temperature and in a sufficiently molten state. However, when the resin containing the foaming agent is extruded out of the die, the resin should not be at such a high temperature. That is, when extruded from the die the resin must be softened enough that it may be foamed, but must not be at such a high temperature that it cannot maintain its shape. Thus, in the method for preparing the foamed article by means of the extruder, the resin containing the foaming agent should be cooled on the way to the die.

This cooling must be carried out equally and uniformly throughout the resin mass because the resin composition containing the foaming agent cannot be foamed uniformly unless the composition has a uniform temperature. For this reason, various methods and apparatuses have been proposed to uniformly cool the molten resin composition. Many of the apparatuses are constructed having a rotating member which can be heated and cooled provided in a barrel, which can be also heated and cooled. The rotating member generally has on its outer surface a number of blades, each of which projects towards inner surface of the barrel and extends substantially in the axial direction of the rotating member. The blades are located in a zigzag pattern in the axial direction.

Japanese Patent Publication No. 48-544 teaches the use of flat plates for the blades and that the plates should be secured to outer surface of the rotating member so that the surface of each of the blades may lie in a tangential plane of the outer surface of the axis. The publication describes these tangential blades as "rotating wings," and mentions that perforations may be provided in the plates. Japanese Patent Publication 54-42026 discloses that the blades should be made of flat plates, which project perpendicularly on outer surface of the rotating member, and further suggests that the blades should be provided with perforations which are inclined towards either outwardly or inwardly by turns in every other one of the blades.

Uniform cooling can seemingly be attained when a mixer formed by a barrel and a member rotatably provided in the barrel is used when the rotating member is further provided with blades, each of which projects on outer surface of the member and extends in the axial direction, and when cooling is carried out at least from a barrel side of the apparatus as mentioned above. However, in case wherein a large amount of resin was extruded with the purpose of obtaining a foamed article having a large cross section, it was not possible to uniformly foam both the surface portion and inner portion of the article when such a mixer was used. Thus further improvement is required in order to manufacture a uniform foam having a large cross-sectional area by an extrusion method with high efficiency.

Aside from the cooling mixer mentioned above, it is known that a zigzag mixer may be used for cooling the resin. This is disclosed, for example, in Japanese Laid-Open Patent Application No. 53-148755. The Laid-Open Patent Application mentions that a zigzag mixer having a specific structure may be used for cooling a molten resin. This structure essentially comprises a conduit with tortuous passages formed therein. However, when a foamable molten resin was passed through the specific zigzag mixer and cooled from outside thereof by circulating a cooling medium into a conduit, as taught by the publication, the resin passed through the mixer tended to be unevenly foamed having a low density in inner portion thereof and a high density in outer surface portion thereof. Moreover, the thus obtained product includes shear lines appearing much like weld lines at places in the product where plates in the zigzag mixer were positioned. These shear lines or weld lines were considered to be drawbacks in quality of the product. Therefore, it was found that when the zigzag mixer was used for cooling and mixing the molten foamable resin, the resin could be cooled but that a uniformly cooled and mixed foam having a large cross section could not be obtained.

Moreover, it is also known that a zigzag mixer can be directly mounted on the forward end of an extruder for simply mixing a resin, i.e. without using the mixer for cooling the resin. This is disclosed, for example, in Japanese Laid-Open Patent Application No. 52-133364. However, in case wherein the zigzag mixer was directly mounted on the forward end of the extruder according to the teachings of the Laid-Open Application, efficient and sufficient cooling could not be attained, and it was not possible to foam the foamable resin uniformly.

OBJECTS AND SUMMARY OF THE INVENTION

It is an object of the present invention to provide a method and an apparatus for producing a uniformly foamable thermoplastic resin.

It is another object to provide a method and apparatus for producing a uniformly foamed product having a large cross-sectional dimension.

It is a further object to provide a method and apparatus for producing a uniformly mixed and uniformly cooled foamable thermoplastic resin useable to make a uniformly foamed product having a large cross-sectional dimension. These and other objects are attained in a method for preparing a thermoplastic foam by extruding molten thermoplastic resin having uniformly distributed therein a foaming agent for the resin, the method comprising the following steps:

An extruded mass of the molten thermoplastic resin is introduced from an extrusion zone directly into a cooling zone. The cooling zone comprises an elongated barrel having a rotating member positioned axially therein in spaced relationship to the barrel so as to provide a passage for the extruded mass between an outer surface of the rotating member and an inner surface of the barrel. The temperature of the cooling zone is controlled by fluid heat exchange. The extruded mass is under pressure in the extrusion zone and in the cooling zone.

The pressurized extruded mass is passed through the passage while simultaneously being intimately mixed by means of projections extending radially from the rotating member into the passage and reaching a close proximity to the inner surface of the barrel and being substantially lowered in temperature with the cooled mass being maintained in its molten flowable state.

The cooled mass is divided into a plurality of separate non-parallel streams.

At least a portion of these streams are separated and recombined to form a combined homogeneous mass having a substantially uniform temperature.

The homogeneous mass is extruded into a lower pressure zone to form a substantially uniform thermoplastic foam.

The streams of resin can be further redivided, separated and recombined. The divided streams can be rotated while separating and recombining. The steps of dividing, separating and recombining are carried out substantially adiabatically. The substantially uniform thermoplastic foam can be a board having a thickness greater than 10 mm.

According to the present invention, an apparatus for preparing a substantially uniform thermoplastic foam extruded from an extrusion means for continuously mixing and extruding a mass of molten thermoplastic having uniformly distributed therein a foaming agent for the resin, can comprise the following structure:

Cooling-mixing means are connected to the extrusion means to continuously receive the extruded mass for intimately mixing and substantially lowering the temperature of the extruded mass. A substantially adiabatic zigzag mixing means is connected to the cooling-mixing means for dividing the cooled mass into a plurality of separate non-parallel streams and for separating and recombining at least a portion of the streams to form a combined homogeneous mass having a substantially uniform temperature. Die means are connected to the substantially abiabatic zigzag mixing means for extruding the combined homogeneous mass into a lower pressure zone to form a substantially uniform thermoplastic foam.

The cooling-mixing means can comprise the following structure:

An elongated barrel having opposite ends, a central axis, and an inner circumferential surface, includes an inlet at one end connected to the extrusion means and an outlet at the opposite end connected to the zigzag mixing means. A jacket surrounds the barrel having a cooling medium inlet and a cooling medium outlet. A cylindrical, hollow, rotating member is rotatably mounted in the barrel aligned along the central axis having an interior and an outer circumferential surface. The rotating member is in spaced relationship to the barrel so as to define a passage for the extruded mass between the inner surface of the barrel and the outer surface of the rotating member. A means for rotating the rotating member is operatively coupled thereto. Pipe means extend longitudinally into the interior of the rotating member for supplying cooling medium therethrough.

A plurality of projections are mounted on the outer surface of the rotating member extending radially into the passage and reaching a close proximity to the inner surface of the barrel. Each projection also extends in an axial direction of the rotating member and has defined therein at least one opening between an upper face thereof and the outer surface of the rotating member.

Each of the plurality of projections can comprise a pair of supports extending radially from the outer surface aligned in parallel with the central axis and a top bar connected to and extending between the pair of supports defining the opening. The top bar has the upper face and a longitudinal dimension extending in parallel with the central axis.

Alternatively, each of the plurality of projections can comprise a flat metal plate blade extending radially of the outer surface and aligned in parallel with the central axis. Such blades have an upper edge defining the upper face and a hole pierced therein defining the opening. The hole is slanted at an acute angle relative to a tangent of the outer surface taken at the point where the blade joins the outer surface of the rotating member.

The substantially adiabatic zigzag mixing means can comprise a conduit having two ends and an axis with the conduit being connected at one of the ends to the cooling-mixing means means and at the other end to the die means. At least one separating element is positioned in the conduit. The separating element has therein a plurality of passages with each having an inlet end and an outlet end defining an advancing direction for the stream of molten resin. Each advancing direction of each passage is at an angle greater than 0° with respect to the axis of the conduit. Different passages are at different angles from each other. The outlet ends open toward the die means.

The separating element can comprise a plurality of metal sheets extending in various directions in spaced and crossing relation defining the plurality of passages. The separating element is positioned in the conduit such that at least partial surfaces of the metal sheets are slanted with respect to the axis of the conduit and the advancing directions vary between continuous passages.

In one embodiment of the separating element, each of the metal sheets is a corrugated sheet and a separating element is formed by placing a number of these corrugated sheets one on another with their peaks or valleys extending in varied directions between continuous sheets whereupon the sheets are fixed at their contacting portions.

In another embodiment of the separating element, the metal sheets form a plurality of sets with the sheets in the same set lying in an imaginary plane. Each of the sheets in a certain set is inserted between the sheets in another set and fixed at the contacting portions to form a crossing member. The crossing members are further crossed and fixed to form the separating member.

In a third embodiment of the separating member, the separating member is formed of a cylindrical block having a number of apertures perforated therein and extending therethrough. The apertures form the passages which are inclined with respect to the axis of the conduit and the advancing direction in a certain aperture is varied from that in a continuous aperture.

The separating member can be rotatably coupled to the rotating member.

The die means can include a means for cooling the die.

Extrudable, foamable thermoplastic resins incorporating a volatile fluid foaming agent are well-known in the art and are well-known commercially. Examples of certain of these are the solid homopolymers of styrene, polyethylene, polypropylene, co-polymers of ethylene and propylene, polycarprolactam, and the like.

Various known foaming agents include dichlorodifluoromethane, methylchloride, butane, and the like.

In the preparation of foams of polymers, often times it is desirable to add various modifying materials during their preparation including finally divided materials such as calcium silicate, talc, dyes, pigments, fire retardants, and the like. Certain times lubricants such as stearic acid monoglyceride are added. Talc may be added as a cell-size controlling agent. These additives are well-known in the art and can be added to the thermoplastic resin in the extruder to effect the desired properties on the final foam.

In using the method or apparatus of the present invention, substantially improved uniformity of the product is obtained whether the product is a foam or a foamable resin. For foamed materials, non-uniformities are most readily determined by judging cell size uniformity and distribution and determining the density of the foamed article or sectional pieces thereof. The article is usually sectioned, inspected visually, and the density of the various sections are determined.

BRIEF DESCRIPTION OF THE DRAWINGS

The above and other objects in the attendant advantages of the present invention will become readily apparent by reference to the following detailed description when considered in conjunction with the accompanying drawings wherein.

Figure 1:
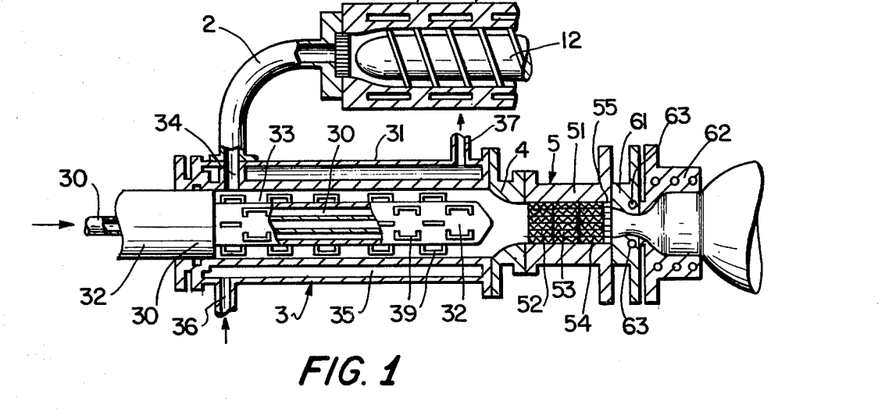
FIG. 1 shows a partial, cross-sectional view of one embodiment of the present invention.

DETAILED DESCRIPTION OF PREFERRED EMBODIMENTS:

FIG. 1, an extruder 1 includes a barrel 11 and a screw 12 rotatably provided in the barrel. Connecting pipe 2 serves to introduce the resin from the extruder 1 to resin inlet 34 of a cooling mixer 3. Cooling mixer comprises a barrel 31 and a rotating member 32 rotatably provided in the barrel. Joint 4 serves to connect the cooling mixer 3 with a zigzag mixer 5. Zigzag mixer 5 comprises a short conduit 51 and separating members 52, 53, 54 provided in the conduit 51.

Cooling mixer 3 includes the barrel 31 and the rotating member 32 provided therein providing a resin passage 33 between barrel 31 and rotating member 32. Resin passage 33 is in communication with resin inlet 34. Barrel 31 is provided with a jacket defining passage 35 for the circulation of a cooling medium. Passage 35 is communicated with a cooling medium inlet 36 and a cooling medium outlet 37. One end of rotating member 32 is extended to the outside of the barrel 31 to form a driving portion. The greater part of the rotating member 32 lies within barrel 31 to form a mixing portion. Between the driving portion and the mixing portion, a supporting portion 30 supports and holds the rotating member 32 in the barrel 31 in a close contacting and rotatable relation.

Rotating member 32 has a hollow internal space in which a pipe 38 is inserted. The forward end of pipe 38 extends to the vicinity of the forward end of the internal space of the rotating member 32. Pipe 38 is provided for circulating a cooling medium in the rotating member 32. A number of blades 39 are provided on outer surface of mixing portion of the rotating member 32. Each of the blades 39 is formed into a hurdle-shape, in which a top bar is situated at central upper portion extending in a parallel relation to the axis of the rotating member, and supports are provided at both ends of the top bar projecting in downwardly radial direction and secured at their lower ends to outer surface of the rotating member.

Figure 2:
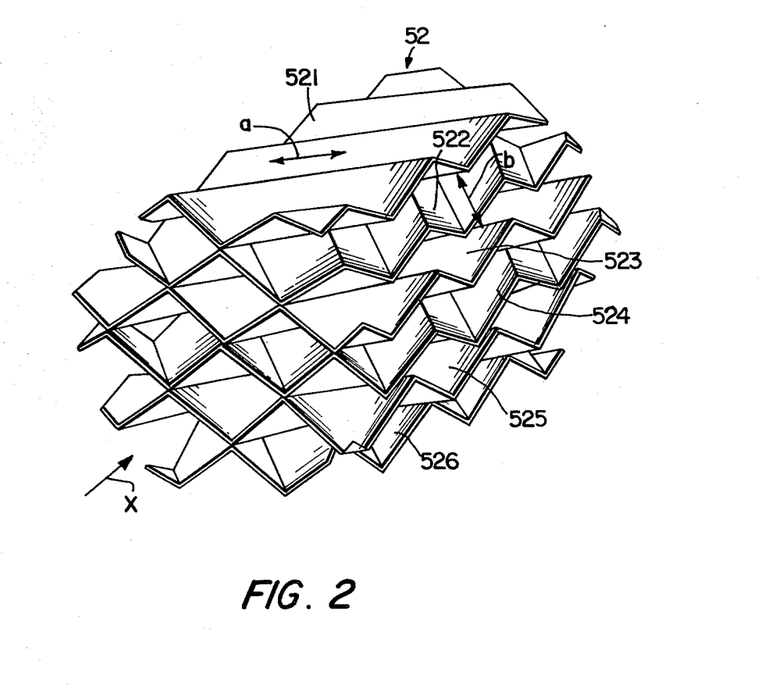
FIGS. 2 and 3 are enlarged, perspective views of a separating member and a blade portion, respectively, shown in FIG. 1.

The zigzag mixer 5 is formed by a short conduit 51 and separating members 52, 53, 54 inserted in the conduit. Each of the separating members 52, 53, 54 can be formed by a number of corrugated sheets of metal 521, 522 . . . etc., as shown in FIG. 2. The sheets are placed one on another so that corrugations between contiguous sheets may be extended in varied directions. The corrugated sheets are mutually secured at their contacting portions. Particularly, for example, when corrugated sheet 521 is placed with the valleys and peaks thereof extending in the direction shown by the arrow a, another corrugated sheet 522 is positioned adjacent to and under sheet 521 with its valleys and peaks thereof extending in the direction shown by the arrow b. These sheets are welded at their mutual contacting portions and secured mutually in a crossing state. Furthermore, a third corrugated sheet 523 is positioned adjacent to and under sheet 522 with its valleys and peaks thereof extending in the direction shown by the arrow, a. The sheet 523 is welded in the same manner to sheet 522 to form a crossing state. Likewise, further corrugated sheets 524, 525, 526 are underlaid one after another and welded to form an integral article, which is a separating member 52. Separating member 52 includes a plurality of passages formed by adjacent sheets therein, the adjacent passages advancing in varying directions with each of the passages having varying heights.

Separating members 53 and 54 are also formed in the same manner as separating member 52. These separating members are placed in the short conduit 51 in the following manner. Separating members 52 and 53 are arranged contiguously and mutually contacted so that passage in one member may be communicated with passages in other member in series and in a crossing relation. Specifically, the members 52 and 53 are aligned such that plane including both directions a and b of separating member 52 is crossed perpendicularly with an imaginary plane including both directions a and b of the other separating member 53. Thereafter, both separating members 52, 53 are welded at their contacting portions to form an integrated member, in which both separating members are connected in a perpendicular crossing relation. Likewise, the third separating member is further connected with the above interested member in a perpendicularly crossing relation to form another integrated member. A perforated stopper 55 is inserted and fixed in the short conduit 51, then the integrated member of members 52, 53, 54 joined together is inserted in conduit 51 and held by stopper 55. When inserted, for example, as shown in FIG. 2, the separating member 52 is located in such a manner that the direction indicated by the arrow x is parallel to the longitudinal axis of the short conduit 51.

In a zigzag mixer 5 thus formed, directions a and b in which peaks and valleys in sheets 521, 522 . . . etc. extend are inclined with respect to the axis x of short conduit 51. Thus, a number of resin passages are formed in separating member 52 by the sheets 521, 522 . . . etc. The resin passages comprise many obstructions to flow due to tortuosity of the sheets, so that a resin flowing therein is forced to form a turbulent flow. Moreover, since edges of the sheets are mutually adjacent in a crossing relation between neighboring separating members, a resin stream passed through one passage is divided by a sheet crossing the passage and lying in the following separating member, and is simultaneously incorporated with another resin stream passing through neighboring passages. Thus, the resin is mixed thoroughly while passing through the separating members and forms a uniform mixture throughout the whole.

A die 61 is connected to the downstream end of the short conduit 51. The die 61 has a passage 63 therein for circulation of a cooling medium. Thus, the inner walls of the die 61 can be cooled if desired. A final sizer 62 can be connected to the outlet of the die 61 and can also be cooled, if desired. The die 61 and the sizer 62 are entirely of conventional design.

The process according to the present invention is explained hereinbelow referring to FIG. 1. A foamable thermoplastic resin containing foaming agent is extruded in a molten state from extruder 1 into connecting pipe 2. The resin in connecting pipe 2 is introduced through resin inlet 34 into cooling mixer 3 and advanced in cooling mixer 3 by the extruding force of extruder 1.

The resin advances through the resin passage 33 between the barrel 31 and the rotating member 32. A number of blades 39 extending in the axial direction are provided on outer surface of rotating member 32. The rotating member 32 is rotated about its longitudinal axis. The resin is mixed by blades 39. Cooling medium is fed into barrel 31 from cooling medium inlet 36 and discharged from cooling medium outlet 37. Cooling medium is also fed into the rotating member 32 from pipe 38, passed around the outside of pipe 38 and discharged. Thus, while passing through cooling mixer, the resin is cooled by both the barrel 31 and the rotating member 32. Simultaneously, the resin is intimately mixed by blades 39 to form a uniform resin composition, which is then discharged from cooling mixer 3.

The resin discharged from cooling mixer 3 is passed through joint 4, and then proceeds into zigzag mixer 5. In zigzag mixer 5, the resin is at first passed through passages separated by sheets in separating member 52, wherein the sheets are corrugated and welded in a crossing state with their peaks and valleys extending in varied directions. The resin is divided into separate streams and flows irregularly to form a turbulent flow and is mixed thoroughly. In addition, since the sheets in separating member 52 extend in directions varied by a 90° angle with respect to sheets in the following separating member 53, when the resin flows from one separating member 52 to another separating member 53, the resin are at least partially combined and redivided to pass between and among the sheets of separating member 53.

Likewise, in flowing from separating member 52 into separating member 53, the streams of resin are once again at least partially combined and redivided to pass between and among the sheets of separating member 54. Thus, because of the turbulence of the flow and of the repeated division and combination of the resin streams, the resin is more thoroughly mixed in the zigzag mixer 5 to form a much more uniform composition throughout the whole.

The passage of the resin through the zigzag mixer is a substantially adiabatic process. Thus, the resin is neither strongly cooled from outside nor from inside of a zigzag mixer 5, so that, when discharged from zigzag mixer 5, the resin has a uniform temperature throughout the whole, including in surface portions close to the conduit 51 or inner portions close to the axis of the conduit 51. In the conventional processes, since the resin was strongly cooled by the barrel 31 and the rotating member 32 in the cooling mixer 3, it cannot be avoided that a temperature gradient is produced in the resin even if stirred by the blades 39. In contrast thereto, according to the present invention, the resin is simply adiabatically mixed by the separating members, so that the resin comes to have a uniform temperature throughout the whole, even at its inner and outer portions.

The resin discharged from zigzag mixer 5 is then introduced into die 61. Since the resin has a uniform temperature in die 61, if die 61 is provided with a large orifice and hence the resin is extruded from the orifice to form a product having a large cross-sectional area, the resin can be foamed uniformly. The product can be obtained in which little or no difference is seen in density, or in cell size and cell distribution between inner portion and outer portion thereof. Further, since the resin is not strongly cooled in the zigzag mixer, the product has no trace of shear lines or weld lines which could be formed by the sheets in the separating member. As a result, a uniform foam having a large cross-sectional dimension or area can be obtained.

When a cooling medium is circulated in passage 63 in die 61, a thin skin of relatively high density can be formed on the outer surface of the resulting foamed article. The skin brings about the remarkable advantages that the foamed article is not only strengthened, but also it becomes hard to crack.

Figures 3, 4:
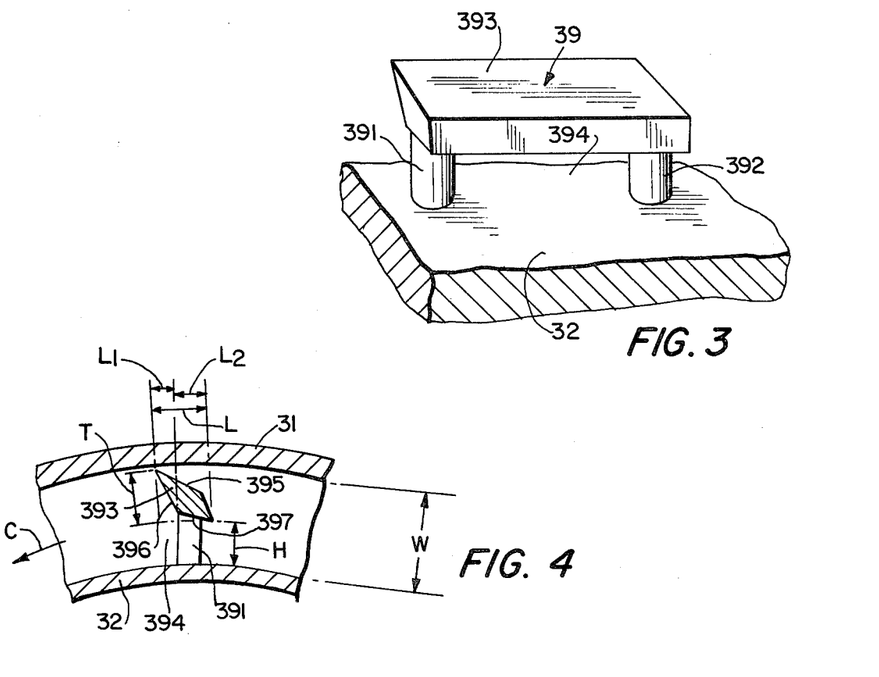
FIG. 4 is a cross-sectional view of the blade portion shown in FIG. 3, shown with a partial cross-section of the barrel and the rotating member.

FIG. 3 shows blades for use in the cooling mixer 3 having a hurdle-like shape. However, it is not required that an opening be formed in the hurdle. Accordingly, the blade may simply be a plate. Blades 39 in FIG. 1 are provided so as to be evenly distributed on entire outer surface of mixing portion of the rotating member 32. Blades 39 are located at pertinent places chosen from the consideration that blades 39 may scrape off any resin in contact with inner surface of barrel 31 when rotating member 32 is rotated, especially paying attention to distribution of the blades in the axial direction of rotating member 32.

In the example shown in FIG. 1, blades 39 are located in the circumferential direction of rotating member 32 so as to be distributed evenly or uniformly and form annular rows. In the axial direction, blades 39 are located in a zigzag alternating relation. That is, blades 39 are arranged in such a relation that, when viewed in the direction along the axis, the blades belonging to one annular row are positioned between the blades belonging to the neighboring annular rows. When viewed in a direction following the circumference, the forward end of the blades belonging to one annular row are just in the same position as rear end of blades belonging to the neighboring annular row.

As shown magnified in FIG. 3, blade 39 is in the form of a hurdle-like frame. Particularly, blade 39 comprises a top bar 393 and two supports 391 and 392, which sustain the top bar at both ends thereof. Each of supports 391 and 392 is shaped as a pillar having an annular cross section. The supports are equal both in height and in diameter, and positioned on the outer surface in pairs aligned parallel to the axis of rotating member 32. Top bar 393 is located with its longitudinal direction extending parallel to the axis of rotating member 32. An opening 394 is thus formed between top bar 393 and the outer surface of the rotating member 32. As for dimensions of the blades, top bar 393 has preferably a length more than one and half times and less than five times the length of a support 391 or 392.

The relationship between the blade 39 and the barrel 31 is as follows:

In FIG. 4, assuming that the rotating member 32 is rotated in the direction of arrow c, upper face 395 of top bar 393 is positioned in close proximity to inner surface of barrel 31. It is preferred that the forward end of upper face 395 is in the closest proximity to barrel 31, and that the upper face forms a slant face sloping downwardly rearwardly. Front face 396 of top bar 393, which faces the direction of rotation, is connected with upper face 395 making an acute angle and forms also a slant face sloping downwardly, rearwardly. Lower face 397 of top bar 393, which faces the outer surface of the rotating member 32, may be formed by an extension of front face 396, and accordingly, lower face 397 may be merged into front face 396.

Opening 394 in blade 39 has a height H, the minimum value of which is greater than a half of height W, which is the height in the resin passage 33 formed between rotating member 32 and barrel 31. In FIG. 4, since lower face 397 of the top bar 393 is formed as a slant face sloping downwardly, rearwardly, height H is smallest at the rear edge of lower face 397 but still accounts for more than a half of height W of the resin passage 33. When this relation is stated on the basis of top bar 393, since top bar 393 is positioned in close proximity to inner surface of barrel 31, the difference between passage height W and opening height H is approximately equal to thickness T of top bar 393, and accordingly thickness T of top bar 393 is less than half of passage height W. As to passage height W, it may normally fall within a range from 20 to 100 mm, preferably from 30 to 50 mm.

Top bar 393 has a length L, measured in the rotating direction of rotatable axis 32. Length L should be more than one-third and less than twice of passage height W. As shown in FIG. 4, when downward face of top bar 393 is formed by front face 396 and lower face 397, length $L_2$, which corresponds to a length of lower face 397 measured in the rotating direction, preferably has a ratio in a range between 1 and 2 and 2 to 1 to the length $L_1$, which corresponds to a length of front face 396 measured in the rotating direction.

FIG. 3 shows a hurdle-shaped blade, in which top bar 393 is supported by two supports 391 and 392, however, the blade used herein may be of other types, for example, a T-shaped one, in which top bar 393 is supported by a single support.

Figure 7:
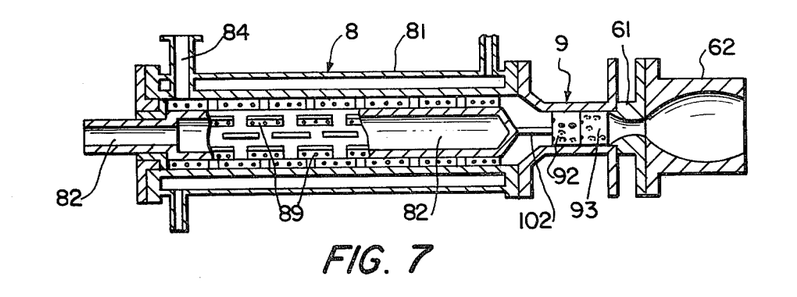
FIG. 7 is a partial, cross-sectional view of a second embodiment of the apparatus, according to the present invention.
Figure 8:
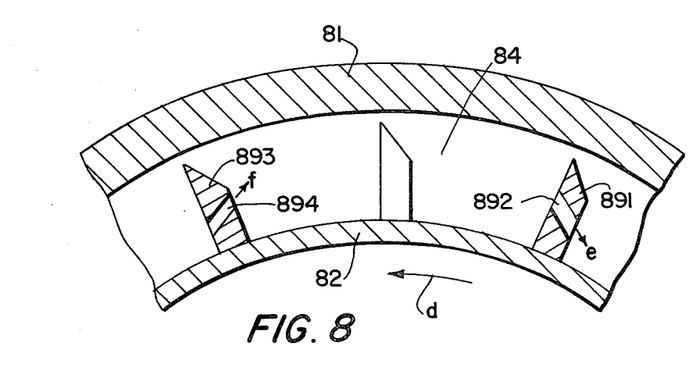
FIG. 8 is a partial, cross-sectional view of a blade portion, of the apparatus shown in FIG. 7.

Blade 89 may be a plate provided with a plurality of perforations as illustrated in FIG. 7. The perforations are preferably inclined obliquely either upwardly or downwardly in each of the blades. Blades having upwardly advancing perforations are arranged alternately with blades having downwardly advancing perforations. Particularly, in FIG. 8 showing some blades 89 enlarged, assuming that rotation member 82 is rotated in a barrel 81 in the direction of arrow d, perforation 892 in blade 891 is directed so as to advance in the direction of arrow e, that is, in the direction obliquely downward, however, perforation 894 in blade 893 adjacent to blade 891 is directed so as to advance in the direction of arrow f, that is, in the direction advancing obliquely upward. When the perforations are provided in the above-mentioned manner, the resin can be mixed more uniformly, because when passed through the perforations, the resin is divided more finely by the perforations and flows toward either the barrel 81 side or the rotating member 82 side alternately.

FIG. 1 shows a rotating member 32 having a single end supported. However, the rotating member may have both ends supported similar to a roller. When the rotating member is shaped as a roller, a resin outlet must be provided on a lateral side of barrel 31.

The separating member in zigzag mixer 5 is not limited to one shown in FIG. 2. The separating member may be, for example, one indicated by reference numeral 7 in FIG. 5. Separating member 7 is composed of crossing members 72, 73 and 74. Particularly, a set of small sheets 721, 722, 723 and 724 are arranged to lie on an imaginary plane in parallel at equal intervals, and another set of small sheets 726, 727, 728 and 729 are also arranged to lie on another imaginary plane in parallel at equal intervals. Both sets of sheets are placed so as to cross each other, and each of the sheets belonging to the latter set is interposed crosswise into the intervals between the sheets belonging to the former set. The contacting portions are welded to form a crossing member 72. Likewise another similar set of small sheets 731, 732, 733, etc. are arranged at equal intervals and interposed crosswise between further another similar set of small sheets 736, 737, 738, etc. to form another crossing member 73. Further, still another crossing member 74 is formed in the same manner. These crossing members 72, 73 and 74 are further crossed in such a manner that, for example, a small sheet 736 in crossing member 73 is inserted between small sheets 731, 732, 733, etc. are arranged at equal intervals and interposed crosswise between further another similar set of small sheets 736, 737, 738, etc. to form another crossing member 73. Further, still another crossing member 74 is formed in the same manner. These crossing members 72, 73 and 74 are further crossed in such a manner that, for example, a small sheet 736 in crossing member 73 is inserted between small sheets 721 and 722 in crossing member 72, and the resulting members are welded at their contacting portions to form a separating member, wherein the crossing members are located so as to align straight the corresponding contacting portions in the crossing member. The separating member in zigzag mixer 5 may be of such an assembly of small sheets as composed of crossing members 72, 73, 74, etc. mentioned above. In the separating member shown in FIG. 5, spaces between small sheets 721 to 738 act as resin passages.

Figure 5:
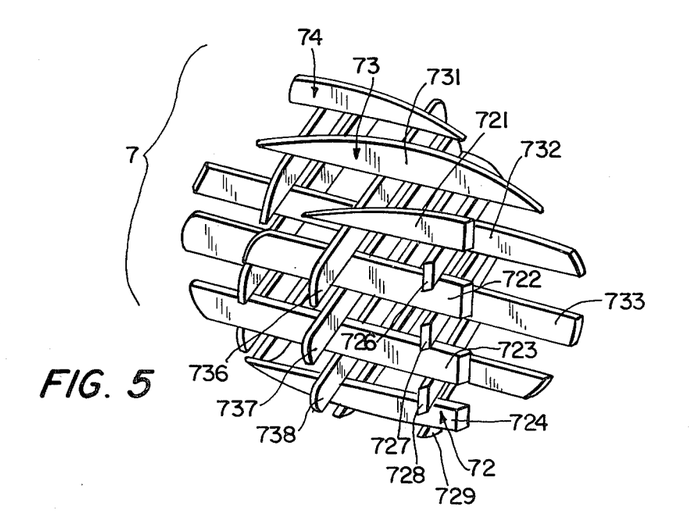
FIGS. 5 and 6 are enlarged perspective views of another separating member which may be used according to the present invention.

Besides the separating member shown in FIG. 5, another separating member as shown in FIG. 6 may be used for the separating member in the zigzag mixer.

Figure 6A:
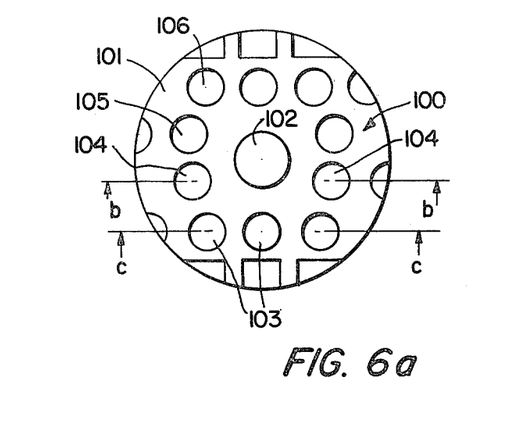
Figure 6B:
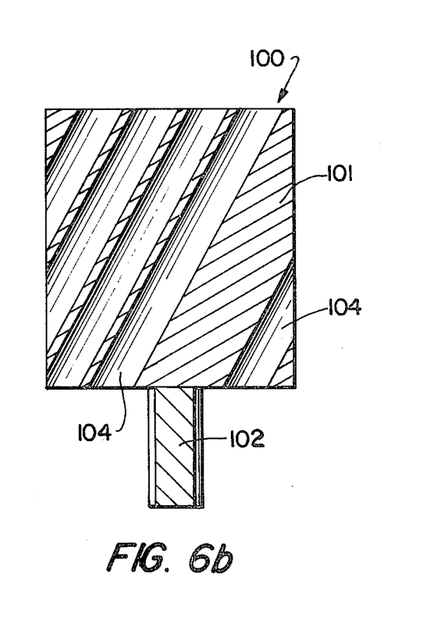
Figure 6C:
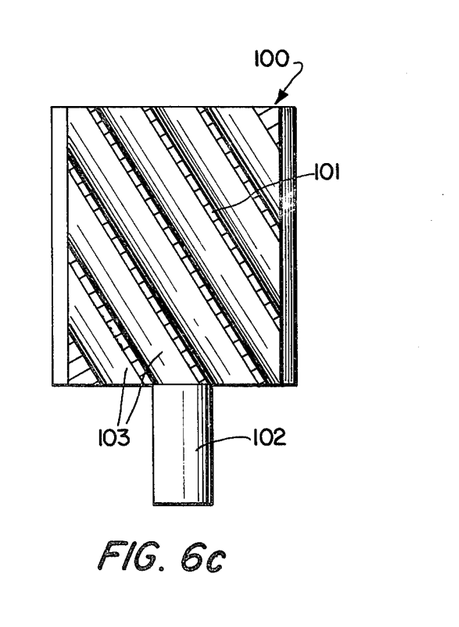

Particularly, separating member 100 shown in FIG. 6 is formed by fixing an axle 102 to a cylindrical metal block 101 and providing in the metal block 101 a number of perforations 103 to 106 extending therethrough. The perforations 103 to 106 extend obliquely with respect to the axis of the cylindrical metal block 101. in addition, the slanting degrees of the perforations 103 to 106 are varied between the adjacent perforations. For example, in the case wherein perforations 103, which are shown in an end view in FIG. 6 (a), are slanted to the left upwardly as seen in FIG. 6 (c), while perforations 104, which are positioned adjacent to perforations 103, are slanted to the right upwardly as shown in FIG. 6 (b). Accordingly, when the resin stream is separated and passed through perforations 103 to 106, and the thus separated resin is collected after having left the perforations, the resin is thoroughly mixed throughout the whole thereof. Axle 102 serves as a rotating axis when separating member 100 is to be rotated in a conduit.

Beside the above-mentioned zigzag mixers, below-mentioned mixers can be used for the zigzag mixer in the present invention. Particularly, U.S. Pat. No. 3,051,453 discloses a mixing apparatus which comprises a conduit and a plurality of sheet metal assemblies inserted therein. The apparatus divides the resin flown in the conduit and intermingles thus divided resin repeatedly. Still further, U.S. Pat. No. 3,286,992 discloses a similar mixing device, which may be also used for the zigzag mixer in the present invention.

In a specific embodiment, the separating member in the zigzag mixer may be rotated in the short conduit. The separating member may be driven either by connecting it to another power source or by connecting to the rotating member in the cooling mixer to rotate in combination with the rotating member 82 in cooling mixer 8 by means of rod 92 and are rotated together with rotating member 82. In the embodiment, the resin is passed through zigzag mixer 9, and mixed much more sufficiently to form a more uniform mixture.

As for rotations of rotating member in the cooling mixer, in the case wherein the member has a large outside diameter, the member should be rotated at a very low speed, however, the member may be rotated normally at a speed of 2 to 10 r.p.m. As for the zigzag mixer, the separating members should be rotated at a somewhat lower speed than that of the axis in the cooling mixer.

The invention is illustrated more particularly by way of examples.

EXAMPLE 1

Polystyrene ("Esbrite 7M" made by Sumitomo Kagaku Kogyo Kabushiki Kaisha), was used as a resin. To 100 parts by weight of polystyrene were added 0.5 parts by weight of fine powdery talc as a cell controlling agent and 2.0 parts by weight of SR 103 (trade name, made by Daiichi Kogyo Seiyaku Kabushiki Kaisha) as a flame retardant. The resulting composition was well mixed and fed into an extruder of 50 mm caliber. Polystyrene was melted by heating a barrel of the extruder at 180° C. A foaming agent was injected into molten polystyrene through an inlet provided at a forward portion of the barrel. A mixture of 30 parts by weight of dichlorodifluoromethane and 70 parts by weight of methyl chloride was used as a foaming agent. The foaming agent was injected under pressure into the mixture in a rate of about 12 parts by weight based on 100 parts by weight of the resin composition. After having the foaming agent injected in the extruder of 50 mm caliber, the resulting mixture was introduced through a connection into another extruder of 65 mm caliber, wherein the mixture was further well mixed and cooled. Then the mixture was introduced in order into a cooling mixer and a zigzag mixer, wherein cooling and mixing was carried out according to the present invention, and thereafter was extruded through a die and was foamed.

Figure 9:
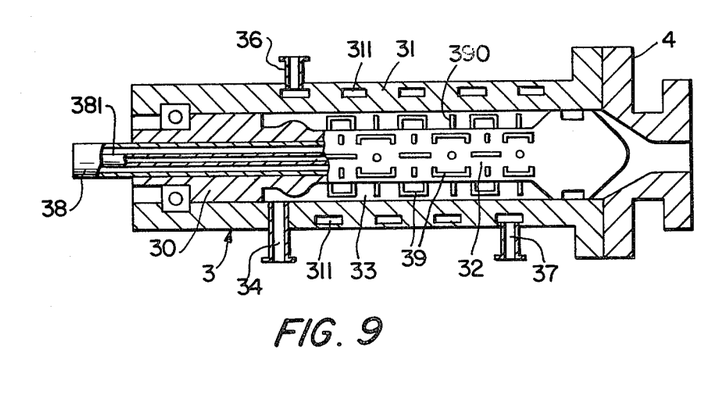
FIG. 9 is a partial, cross-sectional view of another cooling mixer of the apparatus according to the present invention.

The cooling mixer used herein had a structure as indicated by reference numeral 3 in FIG. 9. The structure of cooling mixer 3 in FIG. 9 was similar to that of a cooling mixer 3 shown in FIG. 1, and the same reference numerals as in FIG. 1 were given to the corresponding parts in FIG. 9. In FIG. 9, barrel 31 had an inner diameter of 200 mm, and a length of 1000 mm and was provided with a spiral groove 311 therein. A cooling medium was introduced from medium inlet 36, passed through groove 311 and discharged from medium outlet 37.

Pipe 38 in rotating member 32 is designed to include inner pipe 381 extending in the vicinity of the forward end of member 32, which conveys a cooling medium through inner pipe 381, then passes the cooling medium through spiral groove 311 provided in the outside of inner pipe 381, and then discharges the medium from pipe 38. Between barrel 31 and rotating member 32 is formed an annular passage 33 having a height of 30 mm in the radial direction. On outer surface of rotating member 32 are provided twenty-four hurdle-shaped blades 39, and forty pins 390 between the neighboring blades, each of the blades having 30 mm in height and 100 mm in length, and each of the pins having 30 mm in height and 12 mm in outside diameter. Thus, an opening of 0.1 to 0.3 mm is left between inner wall of barrel 31 and each of the top bars in hurdle-shaped blades 39. Rotating member 32 has at the forward end thereof a screw-pin for use in securing a zigzag mixer, which is to be rotated.

Separating members having a structure as shown in FIG. 2 were used in order to form a zigzag mixer, wherein the separating members were prepared by overlaying corrugated sheets of metal one on another. Particularly, metal sheet assemblies available in the market under the name of mixer SMV manufactured by Swiss company "Sulzer" were used. Two assemblies were connected in series in the same direction but with their facing directions varied by an angle of 90°. The mixer SMV were 60 mm in diameter and 60 mm in length. The corrugated sheets were 1.2 mm in thickness, and referring to FIG. 2, the sheets had a pitch of 20 mm between contiguous peaks. Six sheets were placed one upon another so that the extending directions a and b are inclined on mutually opposite sides by 45° with respect to axial direction X.

Above-mentioned cooling mixer was mounted on the forward end of an extruder, above-mentioned zigzag mixer was further mounted on the forward end of the cooling mixer, a die was mounted on the forward end of the zigzag mixer, and the resin was extruded through these to manufacture a foam. In this case, the resin was extruded from the extruder of 65 mm caliber at a rate of 60 kg per hour, and the rotating member in the cooling mixer was rotated at a rate of 6 revolutions per minute. The resin was extruded under a pressure of 100 kg/cm$^2$ and at a temperature of 140° C. The pressure showed 70 kg/cm$^3$ at the exit of the cooling mixer 3 and the temperature showed 106° C. at the center of the resin passage and 111° C. at the middle between center and outer face in the passage 33 of the cooling mixer 3. Accordingly, the resin temperature was found to vary according to position even at the exit of the cooling mixer 3. However, after having passed through the zigzag mixer, the resin temperature was found to be almost uniform. Particularly, the resin temperature was 111° C. at the center in the passage in the exit of the zigzag mixer, and 112° C. at the middle between the center and the outer face, and 111° C. at the outer face.

Thus, the resin came to have a uniform temperature of 111° C. after having passed through the zigzag mixer and was extruded from the die under a pressure of 35 kg/cm². The die had a rectangular nozzle of 50 mm in width and 2.5 mm in height at the forward end. The extruded resin was foamed and shaped to form a board having width of 150 mm and a thickness of 90 mm. The foamed board was uniformly foamed both in inner portion and outer portion thereof and had cells which were within a range from 0.6 to 0.8 mm and uniform in distribution.

In order to ascertain whether the board was foamed uniformly, the foamed board was cut in the extruding direction to obtain several portions, density of each of which was investigated in the following manner: The foamed board having a thickness of 90 mm was cut in the thickness direction to obtain three equal parts. Among the parts, a middle part having a width of 150 mm was further cut in the width direction to obtain five equal parts, each piece having 3 cm×3 cm in cross section, and which were numbered 1 to 5 in order from one end thereof and used as testing materials. As the result, it was found that the densities of the materials numbered 1 to 5 were 29.3, 29.0, 28.4, 29.3 (kg/m³), respectively, and that the difference between the maximum and minimum densities was 0.9 kg/m³ and deviation from the mean density of 29 kg/m³ was very small. Accordingly, it was concluded that the board was uniformly foamed.

EXAMPLE 2

Foams were prepared and tested in the same manner as described in Example 1, except that blades 39 in the cooling mixer were changed and pins 390 were removed. Particularly, instead of the cooling mixer used in Example 1, which was indicated by reference numeral 3 in FIG. 9, a cooling mixer was used having blades 89 with perforations as indicated by reference numeral 8 in FIG. 7. Each of blades 89 was of 30 mm in height, 100 mm in length and 12 mm in thickness, and had four perforations of 12 mm in diameter. The perforations were slanted upward or downward by 30° with respect to the normal line of the plate surface. The slanting directions were made the same in one blade, but were varied between adjacent blades. For example, when the perforations in a certain blade were slanted from inside to outside of the resin passage, the perforations in an adjacent blade were slanted from outside to inside of the resin passage, and thus the slanting directions were varied in every other blade. In this manner seventy-two blades were secured to outer surface of rotatable axis 82.

Eight blades positioned on each of both ends of the rotating member 82 were slanted by 30° with respect to the member 82 to assist in advancing the resin forward when the member 82 was rotated.

Using above-mentioned cooling mixer and rotating the rotating member 82 at the rate of 6 revolutions per minute, a foamed board was obtained in the same manner as in Example 1.

In the exit of the cooling mixer, the resin had a temperature of 102° C. at the center of the resin passage, and 110° C. at the middle between the center and the outer surface. Accordingly, the resin temperature was found to vary even in the exit of the cooling mixer. However, after having passed through the zigzag mixer, the resin temperature was found to be uniform. Particularly, in the exit of the zigzag mixer, the resin temperature was 109° C. at the center of the resin passage, 108° C. at the outer face, and 110° C. at the middle between the center and the outer face.

The resin extruded from the die was foamed uniformly and finely, and had cell size pieces within a range from 0.6 to 0.8 mm. Five testing pieces were prepared and observed in the same manner as in Example 1. As the results, it was found that the densities of the materials numbered from 1 to 5 were 30.6, 30.2, 31.5, 30.7, 30.1 (kg/m³), respectively, and that the difference between the maximum and minimum densities was 1.4 kg/m³ and deviation from the mean density 30.6 kg/m³ was very small.

EXAMPLE 3

Foams were prepared and tested in the same manner as described in Example 1, except that the zigzag mixer was changed. Particularly, in Example 1 there was used a zigzag mixer having separating members shown in FIG. 2, in contrast, in this Example there was used a zigzag mixer having a single separating member as shown in FIG. 5. The separating member used herein was manufactured by Swiss company "Sulzer" and available in the name of a mixer SMX, which had an outer diameter of 60 mm and a length of 70 mm. Each of sheets 721, 722 ... etc., in the separating member had a thickness of 1.2 mm, and four sheets are grouped to form a set, which is slanted by an angle of 45° with respect to the axis of the resin passage.

At the exit of the cooling mixer, the resin had a temperature of 103° C. at the center of the resin passage, and 108° C. at the middle between the center and the outer face of the resin passage. Accordingly, the resin temperature was found to be un-uniform at the exit of the cooling mixer. In contrast, the resin temperature hardly varied at the exit of the zigzag mixer. Particularly, in the exit of the zigzag mixer, the resin had a temperature of 109° C. at the center of the resin passage, 109° C. at the outer face, and 110° C. at the middle between the center and the outer face.

The resin thus extruded from the die was foamed uniformly and finely, to form an article, which had cell size within a range from 0.6 to 0.8 mm. Five testing pieces numbered from 1 to 5 were prepared and investigated in the same manner as in Example 1. As the results, it was found that the densities of the materials numbered 1 to 5 were 29.3, 28.6, 28.6, 28.7, 28.1 (kg/m³), respectively, that the difference between the maximum and minimum densities was 1.2 kg/m³ and hence deviation from the mean density 28.6 kg/m³ was very small.

EXAMPLE 4

In this example, separating members having a structure indicated by reference numeral 52 in FIG. 2 were used. A bar extending in the direction of arrow X in FIG. 2 was secured to the center at the rear end of the separating member, the bar being further secured to the center at the forward end of the rotating member in the cooling mixer. The separating member was rotated together with the rotating member. Except for the above-mentioned matters, a method for preparing foams was practiced in the same manner as in Example 1, and foams were obtained.

In the exit of the zigzag mixer, the resin had a temperature of 106° C. at the center of the resin passage, 106° C. at the outer face, 107° C. at the middle between the center and the outer face, and hence it was found that the resin temperature hardly varied.

The resin extruded from the die was foamed uniformly and finely to form an article, which had cell size within a range from 0.6 to 0.8 mm. Five testing pieces numbered from 1 to 5 were prepared and observed in the same manner as in Example 1. As the results, it was found that the densities of the testing materials numbered 1 to 5 were 29.8, 28.8, 28.7, 28.7 29.8 (kg/m3), respectively, and that the difference between the maximum and minimum densities was 1.1 kg/m$^3$, hence deviation from the mean density 29.2 kg/m$^3$ was very small.

EXAMPLE 5

In this example, foams were obtained in the same manner as described in Example 1 except that use was the made of another resin composition and another die.

Particularly, a low density polyethylene ("Yukalon HE 30", made by Mitsubishi Yuka Kabushiki Kaisha) was used for the resin. To 100 parts by weight of polyethylene were added to 0.5 parts by weight of fine powdery talc as a cell controlling agent, and 1.0 part by weight of stearic acid mono glyceride as a lubricant, and the resulting product was thoroughly mixed to form a composition. The composition was fed into an extruder of 50 mm caliber, which was the same as that used in Example 1. Foaming agent was injected into the composition in the extruder. As the foaming agent, butane was injected under pressure in the composition in a rate of 8 parts by weight per 100 parts by weight of resin composition.

The resin was extruded from an extruder of 65 mm caliber under a pressure of 100 kg/cm$^2$ at the exit and in a rate of 30 kg per hour. The pressure was 40 kg/cm$^2$ at the entrance of the die, and a temperature of 135° C. at the exit of the extruder of 65 mm caliber. At the entrance of the zigzag mixer, the resin had a temperature of 105° C. at the center of the resin passage, 110° C. at the outer face, and 112° C. at the middle between center and the outer face. In contrast, at the exit of the zigzag mixer, the resin temperature was equally 107° C. at the center, outer face and the middle between them, and was found to be uniform.

The resin was extruded from a nozzle of 1.0 mm height and 100 mm width. The extruded resin was foamed and shaped to a foamed board having 15 mm thickness and 180 mm width. The cell size in the board were within a range from 1 to 2 mm. Five testing pieces were prepared from the board and investigated in the same manner as in Example 1. It was found that the densities of the testing pieces were 31.5, 30.8, 31.1, 30.4, 31.2 (kg/m$^3$), respectively, and that they were uniformly foamed.

EXAMPLE 6

In this example, separating member having a structure indicated by reference numeral 100 in FIG. 6 was used. Axle 102 was fixed on the forward end of the rotating member in the cooling mixer, and the separating member was rotated together with the rotating member. Except for the separating member, the method for preparation was carried out in the same manner as in Example 1 to obtain a foamed board.

In the exit of the zigzag mixer, the resin had a temperature of 112° C. at center of the resin passage, 113° C. at outer face, and 114° C. at the middle between the center and the outer face. Accordingly, the resin temperature was less varied but strictly speaking, somewhat more varied as compared with those in the preceeding examples.

The resin extruded from the die was seen to be foamed uniformly and finely, and had cell size within from 0.6 to 0.8 mm, but strictly speaking, cells in the central portion were smaller than those in the outer portion. Five testing pieces were prepared and investigated in the same manner as in Example 1. As the results, it was found, that the densities of the testing materials were 30.5, 29.2, 28.4, 28.8, 30.0 (kg/m$^3$), respectively, and that the difference between the maximum and minimum densities was 2.1 kg/m$^3$, hence deviation from the mean density 29.4 kg/m$^3$ was relatively small.

COMPARATIVE EXAMPLE 1

Foams were obtained by carrying out a method in the same manner as in Example 1, except that no zigzag mixer was used in this comparative example.

In the exit of the cooling mixer, the resin had a temperature of 106° C. at center of the resin passage, 110° C. at outer face thereof, and 111° C. at the middle between the center and the outer face. Accordingly, the resin temperature was found to be varied.

The foams had a cell size from 0.6 to 1.0 mm and it was observed that there were differences in roughness and fineness of cells in the foams. Five testing pieces numbered from 1 to 5 were prepared for investigation in the same manner as in Example 1, and were found to have densities of 29.6, 29.2, 33.6, 30.6 and 29.1 (kg/m$^3$), respectively. Thus, it was found that the maximum density difference reached 4.5 kg/m$^3$ and accordingly density was varied in wide range compared with the mean density of 30.4 kg/m$^3$.

COMPARATIVE EXAMPLE 2

Foams were obtained in the same manners as in Example 3, except that no cooling mixer was used in this comparative example.

In the exit of the zigzag mixer, the resin had a temperature of 125° C. at center of the resin passage, 123° C. at outer face thereof, and 120° C. at the middle between the center and the outer face. Accordingly, the resin temperature was found to be varied.

The foams had rough cells having sizes within a range from 1.0 to 1.6, had an inner portion unevenly foamed, and were found to shrink when 24 hours elapsed from foaming. Five testing pieces numbered 1 to 5 were prepared from the foams for investigation, and as a result it was found that the testing pieces No. 1 to 5 had a density of 34.4, 33.2, 32.0, 33.6, 33.8 kg/m$^3$, respectively, and that the maximum difference in density was 2.4 kg/m$^3$ and deviation from the mean density of 33.4 kg/m$^3$ was relatively small.

EXAMPLE 7

In this example, foams were prepared in the same manner as in Example 1, except that another die was used, and a cooling medium was circulated in a passage of the die. Particularly, the die was provided with cooling medium passage 63 in the vicinity of forward end thereof as shown in FIG. 1. The die had an orifice of 100 mm width and 0.8 thickness on the forward face thereof.

The same resin composition as in Example 1 was fed into the extruder and extruded under the same conditions as in Example 1, while water at 75° C. was circulated in passage 63. The resin pressure was found to be 75 kg/cm² at the outlet of cooling mixer 3, and the resin temperature was 108° C. at the center of the resin passage and 113° at the middle between said center and outer face of the resin passage. Thus, it was observed that the resin temperature was varied at the outlet of cooling mixer 3. It was, however, observed that, after having passed through the zigzag mixer, the resin temperature was scarcely varied. More particularly, the resin temperature in the outlet of zigzag mixer was 114° C. at the center of the resin passage, 113° C. at the middle between said center and outer face, and 114° C. at the outer face. The resin discharged from the zigzag mixer had a uniform temperature of 114° C. and was extruded from the die under a pressure of 57 kg/cm².

The resin extruded from the die was passed through a forming means to have a desired cross-sectional shape, and thus was formed into a board which had a width of 330 mm, thickness of 30 mm, and a beautiful thin skin on the entire outer surface thereof. Cells in the board were uniformly distributed throughout the whole and had sizes within a range from about 0.4 to 0.6 mm. In order to confirm uniformity of the pores, both sides of the board were cut away by 15 mm, and the remaining board was further cut into five equal testing pieces, which were numbered from 1 to 5 in order. Density was measured of each of the testing pieces. As the result, it was found that the density was 29.7, 28.6, 28.7, 28.6, and 29.5 kg/m³, respectively, and the difference between the maximum and minimum was 1.1 kg/m³, which was small compared with the mean density of 29 kg/m³, and accordingly the board was uniformly foamed.

It is readily apparent that the above-described method and apparatus for preparing thermoplastic foam meets all of the objects mentioned above and also has the advantage of wide commercial utility. It should be understood that the specific form of the invention described hereinabove is intended to be representative only, as certain modifications within the scope of these teachings will be apparent to those skilled in the art.

Accordingly, reference should be made to the following cases to determining the full scope of the invention.

What is claimed is:

1. A method for preparing a thermoplastic foam board having a thickness greater than 10 mm by extruding molten thermoplastic resin having uniformly distributed therein a foaming agent for said resin, the method comprising the continuous steps of:
    (a) introducing an extruded mass of said molten thermoplastic resin from an extrusion zone into a cooling zone;
        (1) the cooling zone comprising an elongated barrel having a rotating member positioned axially therein in spaced relationship to the barrel so as to provide a passage for the extruded mass between an outer surface of the rotating member and an inner surface of the barrel,
        (2) the temperature of the cooling zone being controlled by fluid heat exchange, and
        (3) the extruded mass being under pressure in the extrusion zone and in the cooling zone;
    (b) passing the pressurized extruded mass through said passage while simultaneously:
        (1) intimately mixing the mass by means of projections extending radially from the outer surface of the rotating member into the passage and reaching a close proximity to the inner surface of the barrel and
        (2) substantially lowering the temperature of the mass, the cooled mass being maintained in its molten flowable state;
    (c) dividing the cooled mass into a plurality of separate, non-parallel streams in a zig-zag mixer under substantially adiabatic conditions;
    (d) separating and recombining at least a portion of said streams in said zig-zag mixer under substantially adiabatic conditions to form a combined homogeneous mass having a substantially uniform temperature; and
    (e) extruding the homogeneous mass into a lower pressure zone to form a substantially uniform thermoplastic foam.

2. The method as claimed in claim 1, wherein step (d) further includes further redividing, separating and recombining said streams.

3. The method as claimed in either claim 1 or claim 2 wherein step (c) or (d) further includes rotating said divided streams.

4. An apparatus for preparing a substantially uniform thermoplastic foam board having a thickness greater than 10 mm extruded from an extrusion means for continuously mixing and extruding a mass of molten thermoplastic resin having uniformly distributed therein a foaming agent for said resin, said apparatus comprising:
    cooling-mixing means connected to said extrusion means to continuously receive said extruded mass for intimately mixing and substantially lowering the temperature of the extruded mass,
    substantially adiabatic zigzag mixing means connected to said cooling-mixing means for dividing the cooled mass into a plurality of separate non-parallel streams and for separating and recombining at least a portion of said streams under substantially adiabatic conditions to form a combined homogeneous mass having a substantially uniform temperature, and
    die means connected to said zigzag mixing means for extruding said combined homogeneous mass into a lower pressure zone to form a substantially uniform thermoplastic foam.

5. The apparatus of claim 4 wherein said cooling-mixing means comprises:
    an elongated barrel having opposite ends, a central axis, and an inner circumferential surface, said barrel including an inlet at one end connected to said extrusion means, and an outlet at the opposite end connected to said zigzag mixing means,
    a jacket surrounding said barrel having a cooling medium inlet and a cooling medium outlet,
    a cylindrical, hollow rotating member rotatably mounted in said barrel aligned along said central axis and having an interior and an outer circumferential surface, said rotating member being in spaced relationship to said barrel so as to define a passage for the extruded mass between said inner surface and said outer surface,
    means for rotating said rotating member operatively coupled thereto, pipe means extending longitudinally into said interior of said rotating member for supplying cooling medium therethrough, and a plurality of projections mounted on said outer surface extending radially into said passage and reaching a close proximity to said inner surface, each projection also extending in an axial direction of said rotating member and having defined therein at least one opening between an upper face thereof and said outer surface.

6. The apparatus of claim 5 wherein each of said plurality of projections comprises a pair of supports extending radially from said outer surface aligned in parallel with said central axis and a top bar connected to and extending between said pair of supports defining therewith said opening, said top bar having said upper face and a longitudinal dimension extending in parallel with said central axis.

7. The apparatus of claim 5 wherein each of said plurality of projections comprises a flat metal-plate blade extending radially of said outer surface and a greater part of said projections are aligned in parallel with said central axis, said blade having an upper edge defining said upper face and a hole pierced therein defining said opening, said hole being slanted at an acute angle relative to a tangent to said outer surface taken at a point where said blade joins said outer surface.

8. The apparatus of any one of claims 4, 5, 6, or 7, wherein said zigzag mixing means comprises a conduit having two ends, and an axis, said conduit being connected at one of ends to said cooling-mixing means and at the other end to said die means, and at least one separating element positioned in said conduit having therein a plurality of passages each passage having an inlet end and an outlet end defining an advancing direction for said streams, said advancing direction of each passage being at an angle greater than 0° with respect to said axis of said conduit, different passages being at different angles, said outlet ends opening towards said die means.

9. The apparatus of claim 8, wherein said at least one separating element comprises a plurality of metal sheets extending in various directions in spaced and crossing relations defining said plurality of passages, said at least one separating element being positioned in said conduit such that at least partial surfaces of said metal sheets are slanted with respect to said axis of said conduit and said advancing directions vary between contiguous passages.

10. The apparatus of claim 9, wherein each of said metal sheets is a corrugated sheet, and said at least one separating member is formed by placing a number of said corrugated sheets one on another with their peaks or valleys extending in varied directions between the contiguous sheets, and fixing the sheets at their contacting portions.

11. The apparatus of claim 9, wherein said metal sheets form a plurality of sets, the sheets in the same set lie in an imaginary plane, each of the sheets in a certain set is inserted between the sheets in another set and fixed at contacting portions to form a crossing member, and the crossing members are further crossed and fixed to form the at least one separating member.

12. The apparatus of claim 8, wherein the at least one separating element is formed of a cylindrical block having a number of apertures perforated therein and extending therethrough, the apertures forming said passages which are inclined with respect to the axis of the conduit, and said advancing direction in a certain aperture is varied from that in the contiguous aperture.

13. The apparatus of claim 8 wherein the at least one separating element is adapted to be rotatable.

14. The apparatus of claim 4, wherein said die means includes means for cooling.

* * * * *

UNITED STATES PATENT AND TRADEMARK OFFICE
CERTIFICATE OF CORRECTION

PATENT NO. : 4,454,087
DATED : June 12, 1984
INVENTOR(S) : Motoshige HAYASHI et al It is certified that error appears in the above-identified patent and that said Letters Patent is hereby corrected as shown below:

On the cover page, Item [73], delete "Sekisui Plastics" insert there for --Sekisui Kaseihin Kogyo Kabushiki Kaisha--.

Signed and Sealed this

Twelfth Day of August 1986

[SEAL]

Attest:

DONALD J. QUIGG

Attesting Officer

Commissioner of Patents and Trademarks